United States Patent [19]

Conrad et al.

[11] Patent Number: 5,071,592
[45] Date of Patent: Dec. 10, 1991

[54] UV STABILIZER COMPOSITION FOR SURFACE MODIFICATION OF POLYMER ARTICLES

[75] Inventors: Neal D. Conrad, Trenton; Joseph Silbermann, Old Bridge, both of N.J.

[73] Assignee: M&T Chemicals Inc., Woodbridge, N.J.

[21] Appl. No.: 527,703

[22] Filed: May 24, 1990

Related U.S. Application Data

[63] Continuation of Ser. No. 237,602, Aug. 26, 1988, abandoned.

[51] Int. Cl.$^5$ ............................................. B05D 5/00
[52] U.S. Cl. ................................. 252/404; 252/384; 427/160
[58] Field of Search ................ 252/384, 404; 424/160

[56] References Cited

U.S. PATENT DOCUMENTS

| | | | |
|---|---|---|---|
| 3,043,709 | 7/1962 | Amborski | 117/7 |
| 3,192,074 | 6/1965 | Newhard, Jr. | 148/6.14 |
| 3,297,462 | 1/1967 | Fanning | 117/33.3 |
| 3,309,220 | 3/1967 | Osteen | 117/33.3 |
| 3,519,462 | 7/1970 | Bristol | |
| 3,594,264 | 7/1971 | Urban | 161/168 |
| 3,617,330 | 11/1971 | Peilstocker | 117/33.3 |
| 3,783,011 | 1/1974 | Chauffourreaux | 117/106 R |
| 3,892,889 | 7/1975 | Cohnen et al. | 117/33.3 |
| 3,987,001 | 10/1976 | Wedel et al. | 427/421 |
| 4,126,660 | 11/1978 | Lempkowicz et al. | |
| 4,129,667 | 12/1978 | Lorenz et al. | 427/44 |
| 4,146,658 | 3/1979 | Humphrey | 427/160 |
| 4,322,455 | 3/1982 | Olson et al. | 427/160 |
| 4,323,597 | 4/1982 | Olson | 427/160 |
| 4,349,602 | 9/1982 | Ching | 428/331 |
| 4,349,607 | 9/1982 | Ching | 428/412 |
| 4,353,959 | 10/1982 | Olson et al. | 428/331 |
| 4,382,109 | 5/1983 | Olson et al. | 428/331 |
| 4,396,678 | 8/1983 | Olson | 428/412 |
| 4,439,494 | 3/1984 | Olson | 428/412 |
| 4,556,606 | 12/1985 | Olson | 428/412 |
| 4,636,408 | 1/1987 | Anthony et al. | 427/160 |
| 4,770,905 | 9/1988 | Silbermann et al. | 427/160 |
| 4,868,011 | 9/1989 | Burchill et al. | 427/160 |

FOREIGN PATENT DOCUMENTS

| | | |
|---|---|---|
| 612206 | 1/1962 | Belgium . |
| 134523 | 3/1985 | European Pat. Off. . |
| 151961 | 8/1985 | European Pat. Off. . |
| 2808005 | 8/1979 | Fed. Rep. of Germany . |
| 2808036 | 8/1979 | Fed. Rep. of Germany . |
| 39037 | 11/1975 | Israel . |

OTHER PUBLICATIONS

Katz et al., "Ultraviolet Protection of Transparent PVC Sheets by Diffusion Coatings", Div. Org. Coatings & Plastics, 36(1), pp. 202–206 (1976).

*Primary Examiner*—Deborah L. Kyle
*Assistant Examiner*—Valerie Fee
*Attorney, Agent, or Firm*—Finnegan, Henderson, Farabow, Garrett & Dunner

[57] ABSTRACT

An improvement in the process of incorporating a modifier ingredient into the surface region of a resinous article is described herein. The basic process includes immersing the article in a liquid such as water and contacting the immersed article with a solution of a modifier ingredient in a solvent which is immiscible with the liquid. The improvement herein comprises removing a substantial amount of air dissolved in the water layer to prevent droplets of solution from rising to the surface of the water layer during the process, thereby preventing solid modifier material from accumulating on the water surface.

22 Claims, No Drawings

UV STABILIZER COMPOSITION FOR SURFACE MODIFICATION OF POLYMER ARTICLES

This application is a continuation of application Ser. No. 07/237,602 filed Aug. 26, 1988, now abandoned.

BACKGROUND OF INVENTION

1. Field of the Invention

This invention relates to surface modified resinous articles, and processes for making same, and more particularly, to an improved U.V. stabilizer composition for making said articles in a continuous manner.

2. Description of the Prior Art

In U.S. Pat. No. 4,770,905, issued 9/13/88, filed Dec. 23, 1986, there is described a method of incorporating a modifier ingredient, such as a UV stabilizer e.g. a solid benzophenone, into the surface region of a resinous body, such as a PVC sheet. The method includes the steps of: (1) immersing the body in a liquid, such as water, and (2) contacting the immersed body with a solution of the modifier ingredient in a solvent, such as methylene chloride, which is immiscible with the liquid and which will swell the surface of the resin to allow the solution to enter its surface region.

In the continuous mode of practicing this process, the solution is present as a lower layer, water is the upper layer, a continuous polymer sheet article is transported through the water, and the solution is pumped from the lower layer to the upper layer and directed onto the top surface of the sheet for a predetermined contact time during which the modifier ingredient is incorporated into the contacted surface. After the solution is applied, a jet of water is directed onto the treated surface to displace any residual, solution remaining thereon.

When this process is run for a extended period at room temperature, however, it is observed that a solid precipitate of the UV stabilizer material accumulates on the surface of the water layer. This solid material circulates through the system and tends to clog the pumping and piping equipment used both for applying the solution to the resin surface and for displacing residual solution thereon.

While suitable filters and/or skimmers may be used in the system to remove solid material floating on the surface of the water layer, such techniques require relatively costly equipment and periodic maintenance.

Accordingly, it is an object of the present invention to provide a U.V. stabilizer composition which will not deposit solid modifier material on the surface of the water layer in the resin surface modification process of the aforesaid patent application.

SUMMARY OF THE INVENTION

A U.V. stabilizer solution is provided herein which comprises a mixture of two or more U.V. stabilizers, each of which is ordinarily a solid at room temperature, dissolved in a volatile organic solvent, which stabilizers leave an oil upon evaporation of the solvent.

In the preferred form of the invention, the mixture of U.V. stabilizers includes two or more benzophenones, and the organic solvent is methylene chloride.

DETAILED DESCRIPTION OF THE INVENTION

In accordance with the invention, there is provided herein a U.V. stabilizer solution which avoids the problem of solid formation on the surface of the water layer in the two phase surface modification process of the aforementioned patent. This problem arises from the use of a solid U.V. stabilizer in the process, which leaves a solid upon evaporation of the solvent on the surface of the water layer.

In this invention, the U.V. stabilizer solution is a mixture of two or more stabilizers preferably in an amount of about 10-40 wt. % of the composition each of which is a solid at room temperature; however, upon evaporation of the solvent, an oil rather than a solid is formed on the surface of the water layer. This effect is unexpected since solids ordinarily leaves solid material after the solvent is removed.

A typical mixture of U.V. stabilizers herein inludes at least one benzophenone and another UV stabilizer or antioxidant, as shown in the table below.

Generally the components have melting points which are close to each other and less than 70° C.

The Table below is a list of compositions according to the invention.

TABLE

| Ex. No. | Components of Composition | | | | Ratios. wt |
|---|---|---|---|---|---|
| 1 | UV531 | UV9 | | | 1.5:1 to 1:2 |
| 2 | UV531 | UV9 | DOBP | | 3:5:2 |
| 3 | UV531 | | DOBP | | 4:1 to 1:1.5 |
| 4 | UV531 | | | BHT | 1:1 |
| 5 | UV531 | | | DBP | 1:1 to 2:1 |
| 6 | UV531 | | | PS | 1:1 to 2:1 |

UV531 = 4-octyloxy-2-hydroxybenzophenone
UV9 = 4-methoxy-2-hydroxybenzophenone
DOBP = 4-dodecyloxy-2-hydroxybenzophenone
PS = phenyl salicylate
DBP = 4-decyloxy-2-hydroxy benzophenone
BHT = butylated hydroxy toluene The invention will now be described by reference to the following example.

EXAMPLE

In a laboratory experiment which illustrates the principle of the invention, 500 g of a solution of 200 g of a mixture of solid ultraviolet light stabilizers, U.V. 531 and DOBP(60:40 wt. %) was dissolved in 800 g of methylene chloride, was added to a 4 l bell jar and covered with a 3 l blanket of tap water at 25° C. A peristaltic pump used to pump the solution from the lower solution layer to and through the upper water layer. Pumping of solution was continued for 90 minutes. An oil stabilizer was observed to far on the surface of the water; it was collected and weighed. 2.5 g of such oily liquid material was obtained.

What is claimed is:

1. A UV stabilizer composition comprising:
   a) a mixture of two or more UV stabilizers, each of which is a solid at room temperature and together which form a non-solid material in water, and
   b) a volatile organic solvent,
   at least one of the UV stabilizers being selected such that a oil solid UV stabilizer mixture is left upon evaporation of the solvent after application of the composition to the surface of a resin body.

2. A UV stabilizer composition according to claim 1 wherein (a) is a mixture of hydroxybenzophenones.

3. A UV stabilizer composition according to claim 1 wherein (a) is a mixture of (i) 4-octyloxy-2-hydroxybenzophenone and (ii) 4-dodecyloxy-2-hydroxybenzophenone.

4. A UV stabilizer composition according to claim 3 wherein (a) also includes (iii) 4-methoxy-2-hydroxybenzophenone.

5. A UV stabilizer composition according to claim 3 wherein (i) and (ii) are present in a wt. ratio of 4:1 to 1:1.5, respectively.

6. A UV stabilizer composition according to claim 4 wherein (i), (iii) and (ii) are present in a wt. ratio of about 3:5:2.

7. A UV stabilizer composition according to claim 1 wherein (b) is methylene chloride.

8. A UV stabilizer composition according to claim 1 wherein (a) is present in an amount of about 10–40 wt. % of the composition.

9. A UV stabilizer composition according to claim 1 wherein (a) is a mixture of (i) 4-octyloxy-2-hydroxy benzophenone and (ii) butylated hydroxy toluene.

10. A UV stabilizer system for surface modification of polymer articles comprising:
the UV stabilizer composition of claim 1 and a water layer thereover.

11. A UV stabilizer composition according to claim 3, wherein the volatile organic solvent is methylene chloride.

12. A UV stabilizer composition according to claim 6, wherein the volatile organic solvent is methylene chloride.

13. A UV stabilizer composition according to claim 1, wherein the UV stabilizers have melting points that are less than 70° C.

14. A UV stabilizer system according to claim 10, wherein the UV stabilizers are a mixture of hydroxybenzophenones.

15. A UV stabilizer system according to claim 10, wherein the UV stabilizers is are stabilizers selected from the group consisting of: (i) 4-octyloxy-2-hydroxybenzophenone, (ii) 4-dodecyloxy-2-hydroxybenzophenone, and (iii) 4-methoxy-2-hydroxybenzophenone.

16. A UV stabilizer system according to claim 15, wherein (i), (iii), and (ii) are present in a wt. ratio of about 3:5:2.

17. A UV stabilizer system according to claim 15, wherein the volatile organic solvent is methylene chloride.

18. A UV stabilizer composition according to claim 1, wherein the UV stabilizers together from only an oil in water.

19. A UV stabilizer system according to claim 10, wherein the UV stabilizers together form only an oil in water.

20. A UV stabilizer composition according to claim 1, wherein (a) is a mixture of (i) 4-octyloxy-2-hydroxybenzophenone and (ii) 4-methoxy-2-hydroxybenzophenone.

21. A UV stabilizer composition according to claim 1, wherein (a) is a mixture of (i) 4-octyloxy-2-hydroxybenzophenone and (ii) 4-decyloxy-2-hydroxybenzophenone.

22. A UV stabilizer composition according to claim 1, wherein (a) is a mixture of (i) 4-octyloxy-2-hydroxybenzophenone and (ii) phenyl salicylate.

* * * * *

UNITED STATES PATENT AND TRADEMARK OFFICE
CERTIFICATE OF CORRECTION

PATENT NO. : 5,071,592

DATED : December 10, 1991

INVENTOR(S) : CONRAD et al.

It is certified that error appears in the above-identified patent and that said Letters Patent is hereby corrected as shown below:

Claim 1, col. 2, line 60: delete "oil solid" and insert therefor --non-solid--.

Claim 15, col. 4, line 5: delete "is".

Signed and Sealed this

Thirtieth Day of March, 1993

Attest:

STEPHEN G. KUNIN

Attesting Officer  Acting Commissioner of Patents and Trademarks